Figure 1:
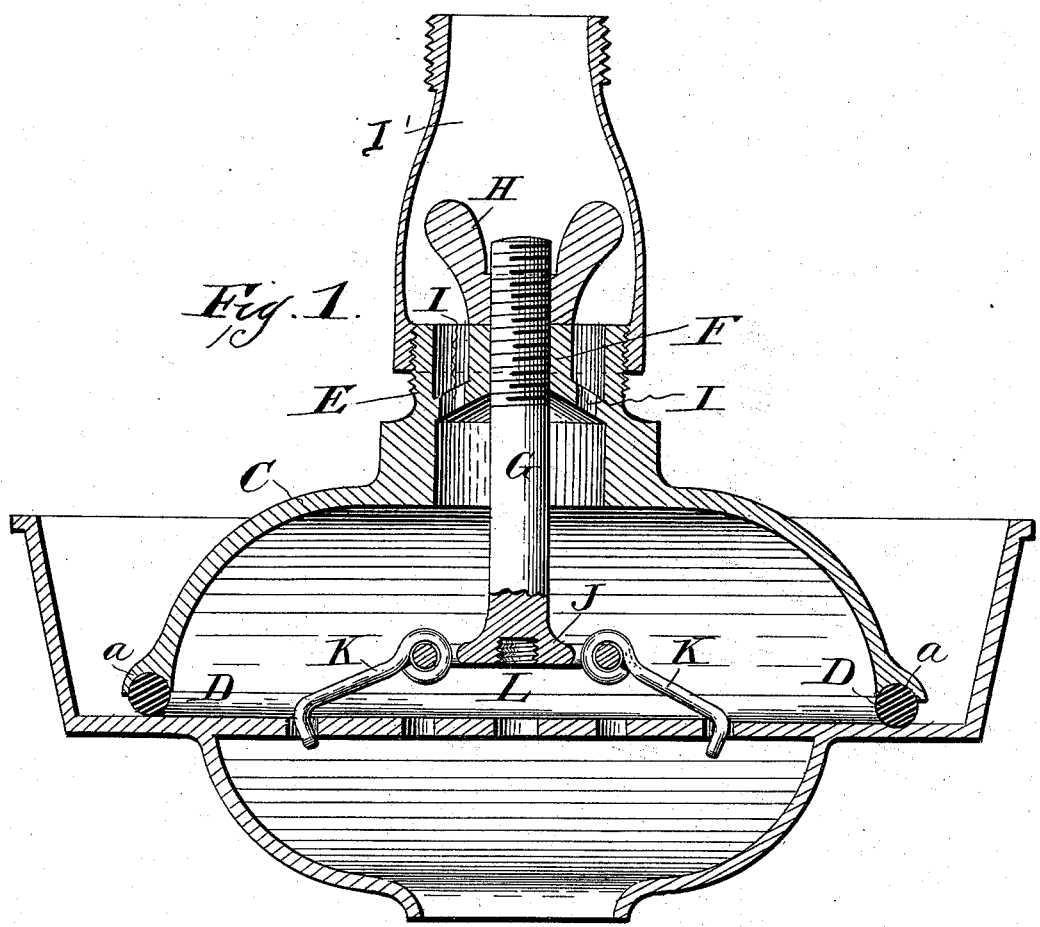

No. 608,207. Patented Aug. 2, 1898.
G. W. MERRITT.
WASTE OR SINK PIPE CLEANER.
(Application filed May 13, 1896.)

(No Model.)

Witnesses.
F. L. Ourand
K. A. Nau

Inventor.
George W. Merritt.
By John Wedderburn
Attorney.

UNITED STATES PATENT OFFICE.

GEORGE W. MERRITT, OF MILLBROOK, NEW YORK.

WASTE OR SINK PIPE CLEANER.

SPECIFICATION forming part of Letters Patent No. 608,207, dated August 2, 1898.

Application filed May 13, 1896. Serial No. 591,420. (No model.)

*To all whom it may concern:*

Be it known that I, GEORGE W. MERRITT, a citizen of the United States, residing at Millbrook, in the county of Dutchess and State of New York, have invented certain new and useful Improvements in Waste or Sink Pipe Cleaners; and I do hereby declare the following to be a full, clear, and exact description of the invention, such as will enable others skilled in the art to which it appertains to make and use the same.

This invention relates to certain new and useful improvements in devices for cleaning waste-pipes of slop-sinks, kitchen-sinks, washbowls, bath-tubs, stationary washtubs, and the like; and it has for its object, among others, to provide a simple and cheap device for this purpose, readily applied, of few parts and those readily assembled, and durable and efficient in its operation.

Other objects and advantages of the invention will hereinafter appear, and the novel features thereof will be specifically defined by the appended claims.

The invention in this instance resides in the peculiar combination and the construction, arrangement, and adaptation of parts, all as more fully hereinafter described, shown in the drawings, and then particularly pointed out in the claims.

The invention is clearly illustrated in the accompanying drawings, which, with the letters of reference marked thereon, form a part of this specification, and in which—

Figure 2:
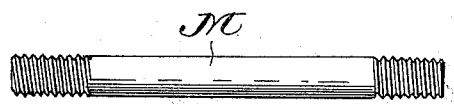
Figure 3:
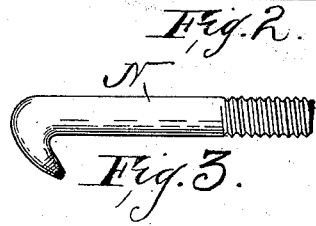

Figure 1 is a substantially central vertical section of the improvement in position. Fig. 2 is a view of the screw employed in the bottom of the spindle. Fig. 3 is a view of another form of screw.

Like letters of reference indicate like parts throughout the several views.

Referring now to the details of the drawings by letter, A designates an iron sink, and B the strainer thereof.

C is the metallic pressure-cup, having at its lower edge an annular channel $a$, in which is seated a rubber gasket D, while near its upper end it has an exteriorly-threaded tubular portion E, as shown, and from this tubular portion extends the spider F, having a boss F', through which passes the spindle G, which receives upon its threaded portion the wing-nut H, which bears upon the upper end of the boss, the spider having openings I, through which the water may pass.

I' is a reducer on the threaded portion of the tubular part of the cup. This reducer is a connection between the sink-cleaner and any source of water-pressure or a good force-pump.

The lower end of the spindle has the disk portion J, in which are pivotally held the hooks K, more or less in number. The lower end of the spindle has a screw-threaded socket L, into which is designed to be detachably engaged a screw M for use in washbowls and bath-tubs in place of the hooks, one end of said screw being engaged in the socket and the other end adapted to receive a nut to hold the parts in place.

N is a screw which may be used in place of the hooks or of the screw M in steel sinks, where the strainer is not heavy enough to hold the hooks.

The operation will be apparent. The device is applied as shown in Fig. 1 and the water turned on, when, on account of the pressure, the openings in the strainer will be quickly cleaned out. The device may be applied very easily and quickly and is most effectual in its work.

Modifications in detail may be resorted to without departing from the spirit of the invention or sacrificing any of its advantages.

What is claimed as new is—

1. The combination with a metallic pressure-cup having an annular channel at its lower edge and a gasket seated therein, terminating at its upper end in an exteriorly-threaded tubular portion, of a spider extending from said tubular portion and having a boss, a spindle passed through said boss, a wing-nut upon the upper end of said spindle, said spider being provided with openings, a disk-like projection on the lower end of the spindle, and hooks pivotally mounted on said disk-like portion, substantially as described.

2. The combination with a metallic pressure-cup having an annular channel at its lower edge and a gasket seated therein, terminating at its upper end in an exteriorly-threaded tubular portion, of a spider extending from said tubular portion and having a boss, a spindle passed through said boss, a wing-nut upon the upper end of said spindle, said spider being provided with openings, a disk-like projection on the lower end of the spindle, and hooks pivotally mounted on said disk-like portion, the lower end of said spindle being provided with a screw-threaded socket, and a detachable screw engaged therewith, substantially as described.

3. The combination with a bell terminating at its upper end in an exteriorly-threaded tubular portion, of a spider extending from said tubular portion and having a boss, a spindle passed through said boss, a nut upon the upper end of said spindle, said spider being provided with openings, a head on the lower end of the spindle, and hooks pivotally mounted on said head.

In testimony whereof I have signed this specification in the presence of two subscribing witnesses.

GEO. W. MERRITT.

Witnesses:
JAY HAIGHT,
HOWARD HAIGHT.